(12) United States Patent
Citro et al.

(10) Patent No.: US 11,560,881 B2
(45) Date of Patent: Jan. 24, 2023

(54) ACTUATOR ASSEMBLIES COMPRISING SHAPE MEMORY ALLOY WIRES AND A COATING WITH PHASE CHANGING MATERIALS PARTICLES

(71) Applicant: Saes Getters S.p.A., Lainate (IT)

(72) Inventors: Marco Citro, Varese (IT); Davide Frigerio, Inverigo (IT)

(73) Assignee: Saes Getters S.p.A., Lainate (IT)

( * ) Notice: Subject to any disclaimer, the term of this patent is extended or adjusted under 35 U.S.C. 154(b) by 485 days.

(21) Appl. No.: 16/612,898

(22) PCT Filed: Jun. 29, 2018

(86) PCT No.: PCT/IB2018/054853
§ 371 (c)(1),
(2) Date: Nov. 12, 2019

(87) PCT Pub. No.: WO2019/003198
PCT Pub. Date: Jan. 3, 2019

(65) Prior Publication Data
US 2020/0169195 A1    May 28, 2020

(30) Foreign Application Priority Data

Jun. 30, 2017  (IT) .................. 102017000073563

(51) Int. Cl.
*F03G 7/06* (2006.01)
(52) U.S. Cl.
CPC ............. *F03G 7/066* (2021.08); *F03G 7/065* (2013.01); *F03G 7/0614* (2021.08); *F03G 7/0616* (2021.08); *F03G 7/06114* (2021.08); *F03G 7/06143* (2021.08)

(58) Field of Classification Search
CPC ...... F03G 7/06; F03G 7/0614; F03G 7/06143; F03G 7/0616; F03G 7/06114; F03G 7/065; F03G 7/066
See application file for complete search history.

(56) References Cited

U.S. PATENT DOCUMENTS

| 8,739,525 | B2 | 6/2014 | Mankame et al. |
| 2011/0083431 | A1* | 4/2011 | Mankame ............... F03G 7/065 60/527 |

(Continued)

FOREIGN PATENT DOCUMENTS

| EP | 1 541 188 A1 | 6/2005 |
| WO | WO 2007/036097 A1 | 4/2007 |
| WO | WO 2009/059332 A1 | 5/2009 |

OTHER PUBLICATIONS

International Preliminary Report on Patentability, issued in PCT/IB2018/054853, dated Oct. 17, 2019.

(Continued)

*Primary Examiner* — Mark A Laurenzi
*Assistant Examiner* — Xiaoting Hu
(74) *Attorney, Agent, or Firm* — Element IP, PLC (57) ABSTRACT

Actuator assemblies comprising a core made up of a shape memory alloy wire and a coating containing a distribution of Phase Changing Material (PCM) particles with a given weight ratio between said particles and said shape memory alloy wire, and active cloths incorporating one or more of said actuator assemblies.

20 Claims, 5 Drawing Sheets

(56) References Cited

U.S. PATENT DOCUMENTS

| | | | | |
|---|---|---|---|---|
| 2015/0289994 A1* | 10/2015 | Engeberg | ............... | F03G 7/065 60/527 |
| 2017/0252260 A1* | 9/2017 | Gummin | ............... | A61H 11/00 |
| 2019/0049034 A1* | 2/2019 | Ohrem | ..................... | B67C 3/28 |

OTHER PUBLICATIONS

International Search Report, issued in PCT/IB2018/054853, dated Oct. 30, 2018.
Written Opinion of the International Preliminary Examining Authority, issued in PCT/IB2018/054853, dated Jun. 7, 2019.
Written Opinion of the International Searching Authority, issued in PCT/IB2018/054853, dated Oct. 30, 2018.

* cited by examiner

Fig.1A  Fig.1B

PRIOR ART

ACTUATOR ASSEMBLIES COMPRISING SHAPE MEMORY ALLOY WIRES AND A COATING WITH PHASE CHANGING MATERIALS PARTICLES

The present invention relates to improvements in the thermal management of shape memory alloy (SMA) wires.

The use of shape memory alloy wires as part of actuators and actuating systems is more and more appreciated due to their simplicity, ease of integration in a number of devices and reduced costs compared to technically equivalent solution such as, for example, micro-motors.

Actuator assemblies and actuating systems employing shape memory alloy wires are known in the art. The international patent application WO 2016/156283 in the Applicant's name e.g. relates to a lock having an emergency actuator. The European patent number 2615951 in the Applicant's name describes an actuating system for a valve installed in a multi-beverage vending machine. The European patent 2171183 in the Applicant's name describes an actuator having a broadened range of working temperatures. The international patent application WO 2015/150377 describes an actuating element in a household appliance.

The patent publications mentioned above are just some examples amongst many other ones teaching how to successfully exploit the features of shape memory alloy wires and more particularly their capability to exert a force once heated by Joule effect thanks to their phase transition from a martensitic microstructure to an austenitic microstructure. In the examples above the shape memory alloy wires are arranged in straight configuration and forces are exerted as a consequence of a linear shortening of the wire. There are other examples and applications, such as the one described in the U.S. Pat. No. 9,068,561, envisioning the possibility of arranging shape memory alloy wires such that they are spirally wound.

Another application envisions the use of a plurality of SMA wires disposed according to a specific pattern to be incorporated in a cloth or fabric, as disclosed in the international patent application WO 2016/153917, which relates to a body massager, or in the European patent 2782824, which teaches the use of SMA wires as a means to control and adjust boat sails.

Actuating systems based on shape memory alloy wires that are frequently actuated require thermal management of the wires. Heat is in fact generated upon each actuation cycle and residual heat must be properly managed so as to preserve operation of a SMA wire actuator or actuating system over time. The U.S. Pat. No. 9,068,561 teaches how to manage residual heat by resorting to an electrically insulating coating which is a heat conductor. The U.S. Pat. No. 6,835,083 describes a shape memory alloy wire having an enclosing sheath capable to improve cooling after every actuation cycle.

Also known is the thermal management of actuators employing SMA wires by way of Phase Changing Materials (PCM), which feature the ability to absorb and release large quantities of heat when subjected to a change of phase, e.g. solid-to-liquid. The U.S. Pat. No. 8,739,525 discloses examples of how these materials may be employed. PCM beads may e.g. be dispersed in a thermally conductive polymeric matrix applied as a coating on a SMA wire.

The availability of numerous examples of actuators and actuating systems employing SMA wires notwithstanding, there is still the need to find improved solutions as far as thermal management of the SMA wires is concerned, which is the purpose of the present invention.

In a first aspect thereof the invention consist in an actuator element having a core made up of a shape memory alloy wire and a coating that is applied on at least a portion of said shape memory alloy wire and comprises particles of a Phase Changing Material (PCM), characterized in that the ratio between the weight of Phase Changing Material particles dispersed or distributed in the coating and the weight of the portion of the shape memory alloy wire on which the coating is applied or formed is comprised between 1 and 30.

The weight ratio is referred to the coated portion of the SMA wire of the actuator element because one or both ends thereof may be uncoated in order allow its connection to a source of electrical current enabling operation of the SMA wire.

According to a preferred embodiment of the invention at least 80% of the length of the shape memory alloy wire is covered by the coating containing PCM particles.

The invention will be further illustrated with the help of the attached drawings, wherein.

A phase change material (PCM) is a substance having a high latent heat of fusion which is capable of absorbing and releasing large amounts of heat by e.g. melting and solidifying at a certain temperature. Heat is absorbed or released when the material is subjected to a phase transition e.g. from solid to liquid or from liquid to gas and vice versa. PCM materials are classified as latent heat storage (LHS) units.

The presence of PCM particles is a known means to improve thermal management of a SMA wire actuator assembly. The inventors have observed that by employing PCM particles dispersed in a coating applied on at least a portion of a shape memory alloy wire allows to achieve a faster cooling thereof when this is de-activated by interrupting supply of electrical current. This leads to a quicker response of the shape memory alloy wire when it is activated again by supplying an electric current, because residual activation heat has been absorbed.

According to the invention, the ratio between the weight of PCM particles dispersed in a coating applied to a shape memory alloy wire and the weight of the portion of the shape memory alloy wire on which the coating is applied or formed is comprised between 1 and 30.

According to an embodiment of the invention the diameter of the shape memory alloy wires is comprised between 0.1 and 0.8 mm and their respective coatings have a thickness comprised between 0.1 and 3 mm. In this regard, it is important to underline that since the shape memory alloy wires are real objects, departures from a circular section are possible, so the term diameter is to be intended as the diameter of the smallest enclosing circle.

Shape memory alloy wires having a larger diameter have a thicker coating. More particularly, a width ratio between the diameter of a coated shape memory alloy wire and the diameter of the sole shape memory alloy wire is comprised between 2 and 5.

According to an embodiment of the invention the size of the PCM particles is comprised between 0.01 and 0.1 mm. When PCM particles are substantially spherical the term "size" refers to their diameter, while in case of PCM particles having an irregular shape the term "size" refers to their largest dimension.

Various materials can be used to make the coating applied or formed on the shape memory alloy wires of the actuator assembly of the invention. Preferred materials are plastics and thermoplastic polymeric materials, thermosetting polymeric materials resins and silicones.

Preferred PCM materials are chosen among wax (preferably paraffin wax), fatty acids, esters, salts, hydrates, organic and inorganic compounds.

According to an embodiment of the invention, the PCM particles are enclosed in a shell made of a non-PCM material having a fusion temperature higher than the fusion temperature of the PCM material. The shell acts as a housing preventing losses of PCM material after phase transition. Thanks to this feature, it is possible to avoid resorting to dense and impermeable coatings in order to prevent dislocation and loss of PCM material.

The shell weight is a fraction of the PCM particle weight, typically comprised between 5% and 50%.

The invention is not limited to any specific shape memory alloy material, even though preferred are Ni—Ti based alloys, such as the alloy commonly known with the trade name of Nitinol, whose basic properties are described in U.S. Pat. No. 4,830,262. The newer and improved shape memory alloys described in U.S. Pat. Nos. 8,152,941 and 8,430,981 in the name of SAES Smart Materials may also be employed.

In particular the term Ni—Ti based shape memory alloy encompasses shape memory alloy with a preponderant content of nickel and titanium (at least 60 atomic percent, at %), as additional elements may impart different properties such as lower hysteresis in case of Ni—Ti—Cu alloys, described for example in the U.S. Pat. No. 4,565,589, of higher transformation temperature as in the case of Ni—Ti—Hf alloys, described for example in the U.S. Pat. No. 5,114,504.

The actuator assembly according to the present invention may advantageously be used in active systems employing a plurality of coated shape memory alloy wires embedded in a fabric or cloth and arranged parallel to each other, wherein thermal management is most critical due to the large number of wires, which is typically comprised between 2 and 100 per unit width.

According to an embodiment of the invention, a single coated SMA wire is embedded in a fabric or cloth sewed into a specific pattern such as, for example, parallel linear portions with curved extremities. The total cross section of the shape memory alloy wires may be comprised e.g. between 0,007 $mm^2$ and 0.5 $mm^2$.

The terms "fabric" or "cloth" have to be construed in their largest meaning, i.e. a web produced by weaving or knitting textile fibers.

It is to be underlined that the present invention is not limited to a specific technique for forming or applying the coating on the SMA wires. The coating may e.g. be formed on each single wire before incorporation in an active system, or applied at a later stage after incorporation in the active system.

The invention will be further illustrated with the help of the following non-limiting examples.

EXAMPLE 1—SAMPLE STRUCTURES

Four different samples were prepared. All samples had the same basic structure consisting of a woven nylon-cotton cloth incorporating nine SMA wires made of Nitinol having a diameter of 0.15 mm and a length of 100 mm. The nine SMA wires were arranged parallel to each other.

Figure 1A:
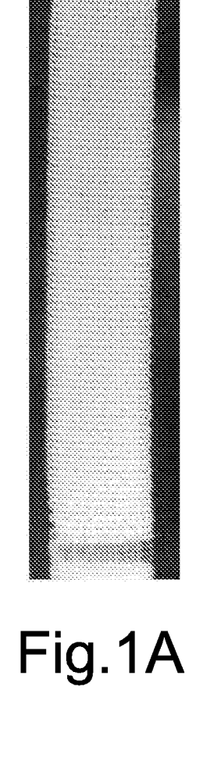
FIG. 1A, is a photo of an actuator system according to the prior art wherein uncoated shape memory alloy wires are embedded in a fabric.
Figure 1B:
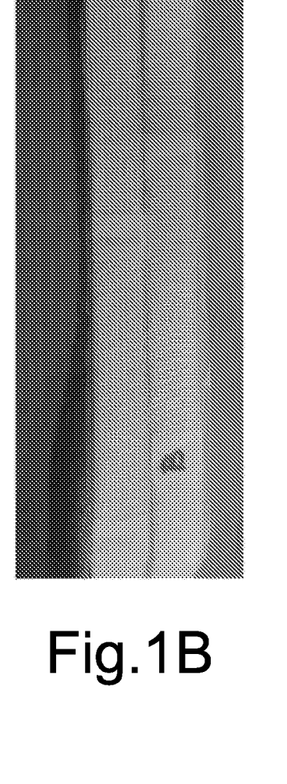
FIG. 1B is a photo of an actuator system according to the prior art wherein shape memory alloy wires having a coating without PCM particles are embedded in a fabric.

FIG. 1A shows a comparative sample C1 incorporating non-coated SMA wires. A comparative sample C2 incorporated shape memory alloy wires with a 300 micron thick coating made of polyurethane without a PCM particle dispersion and its picture is shown in FIG. 1B. A comparative sample C3 (not shown in the drawings) incorporated shape memory alloy wires with a 300 micron thick coating made of polyurethane containing a dispersion of PCM particles in an amount of 4 $mg/cm^2$. The particles were made of paraffin and comprised a polymeric shell (90 wt % paraffin, 10 wt % shell). The ratio between the weight of the PCM particles dispersed in the coating and the weight of the portion of the shape memory alloy wire on which the coating was applied or formed was 0.7, therefore below the lower limit of range defined above.

Figure 1C:
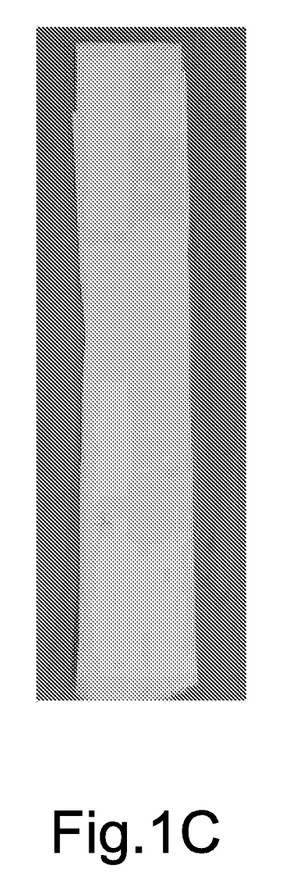
FIG. 1C is a photo of an actuator system according to the present invention, wherein shape memory alloy wires having a coating with a dispersion of PCM particles.

A sample S1 made according to the present invention incorporated shape memory alloy wires with a 300 micron thick coating made of polyurethane containing a dispersion of PCM particles in an amount of 40 $mg/cm^2$. The particles were made of the same PCM material used in the comparative sample C3, but the ratio between the weight of the PCM particles dispersed in the coating and the weight of the portion of the shape memory alloy wire on which the coating was applied or formed was 7, hence falling in the range defined above. Sample S1 is shown in FIG. 1C.

Comparative sample C4 is made by putting the SMA wire at the center of a cylindrical container with an inner diameter of 12 mm filled with the PCM material. This situation is representative of a situation outside the present invention, when a higher PCM amount is used.

In the comparative samples C3 and C4 and samples S1 and S2 the amount of PCM particles is expressed in weight (milligrams) over area ($cm^2$), which means that the coating has an uniform surface distribution, and that the density is determined by taking into account the coating thickness, e.g. set at 300 micron for all the coated wires of the tested samples (C2, C3, C4, S1, S2).

The features of the different samples are summarized in table 1 below.

TABLE 1

| | Sample features | | |
|---|---|---|---|
| Sample ID | Coating material | Coating Thickness (μm) | Weight Ratio PCM particles/coated portion of the SMA wire |
| C1 | None | — | — |
| C2 | Polyurethane | 300 | 0 |
| C3 | Polyurethane | 300 | 0.7 |
| C4 | PCM | 5850 | 50 |
| S1 | Polyurethane | 300 | 7 |
| S2 | Polyurethane | 300 | 16 |

EXAMPLE 2: SAMPLE CHARACTERIZATION

The samples were subjected to subsequent activation cycles by supplying a current of a 8 Ampere at a frequency of 1 Hz.

FIGS. 2, 3, 4 5, 6 and 7 show how the stroke changes over time in comparative samples C1, C2, C3, C4, S1 and S2, respectively.

Figure 2:
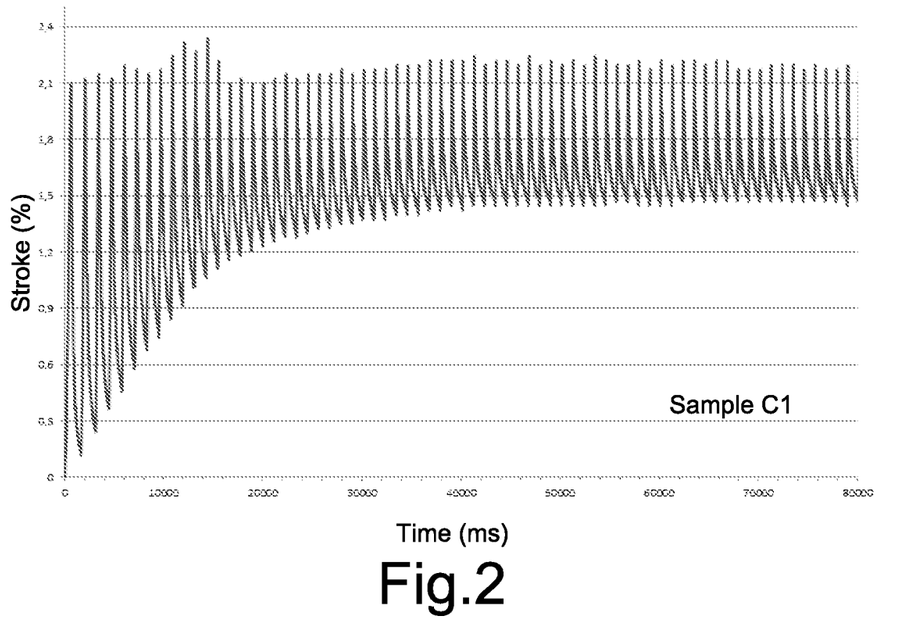
FIGS. 2-7 are experimental characterization diagrams of samples of SMA wire actuator assemblies according to the prior art and to the invention, respectively, the diagrams schematically showing how the stroke of the respective SMA wires varies over time when the assemblies are subjected to subsequent activation cycles.
Figure 3:
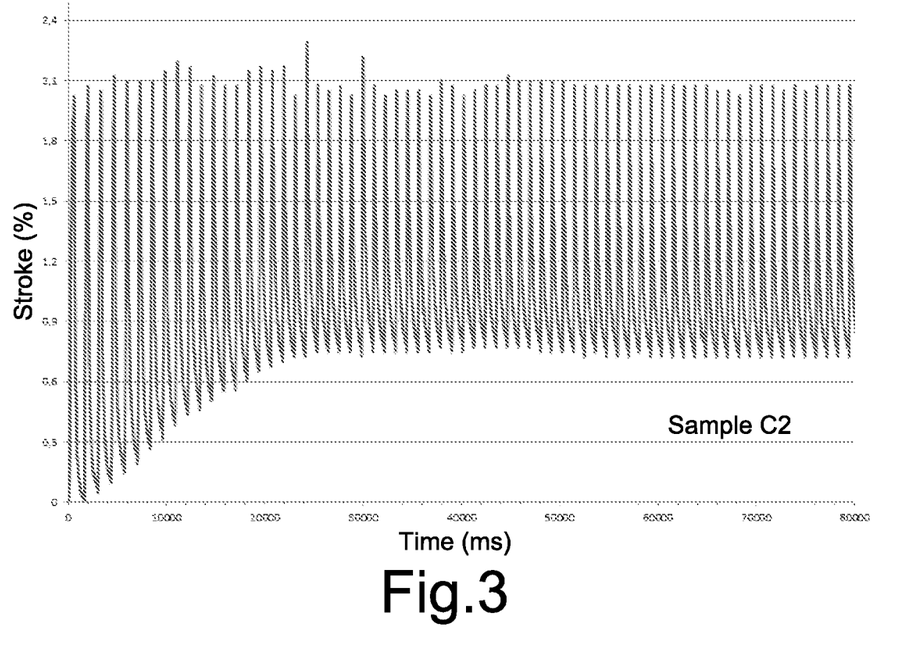
Figure 4:
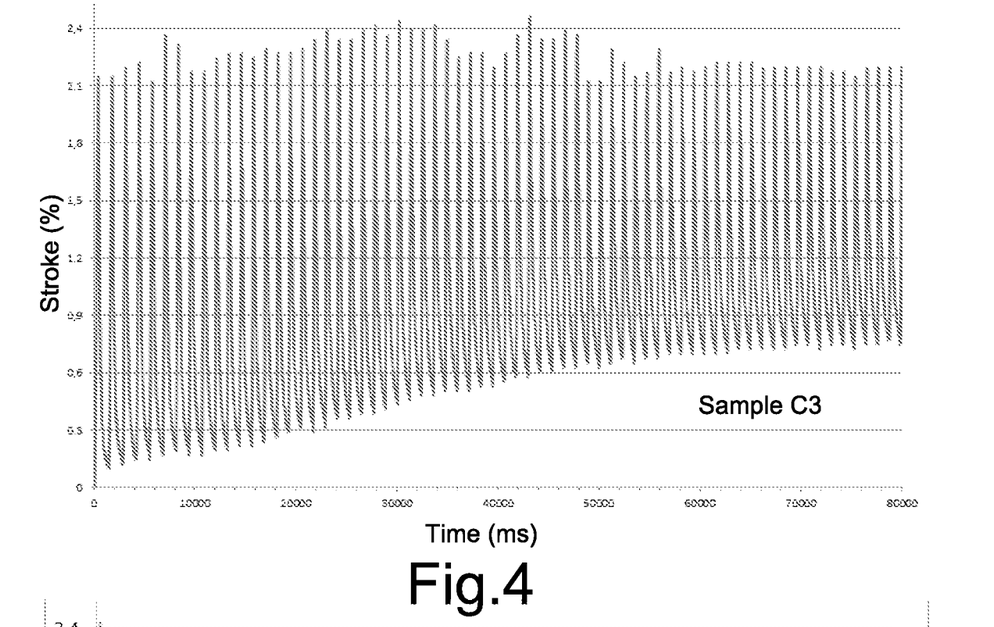
Figure 5:
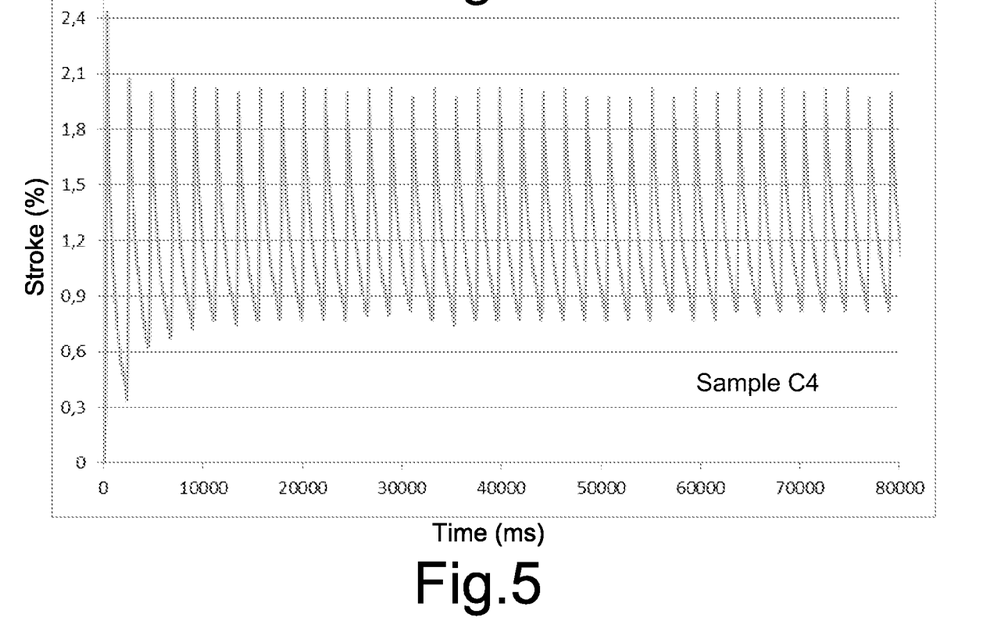
Figure 6:
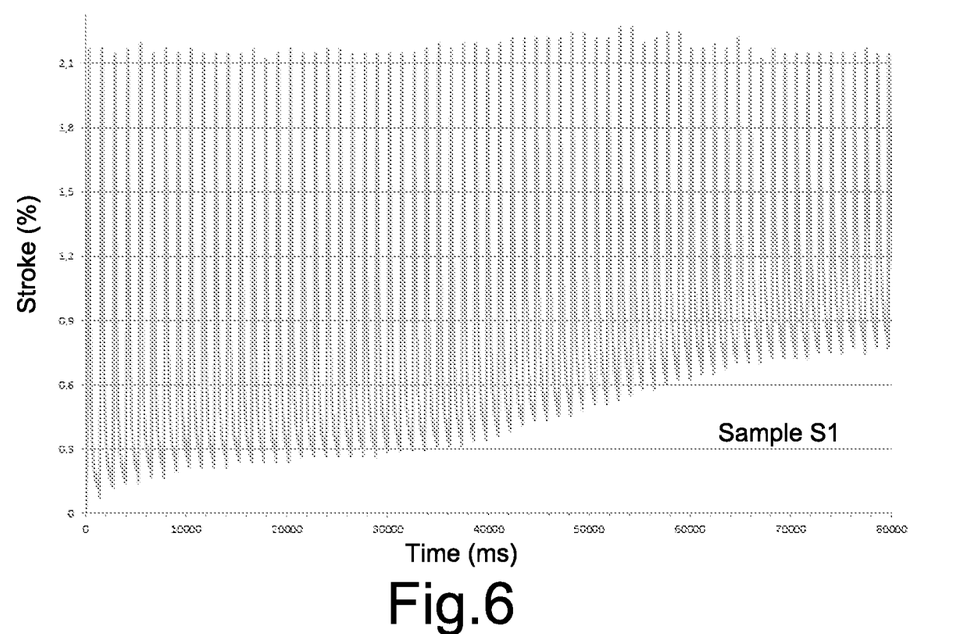
Figure 7:
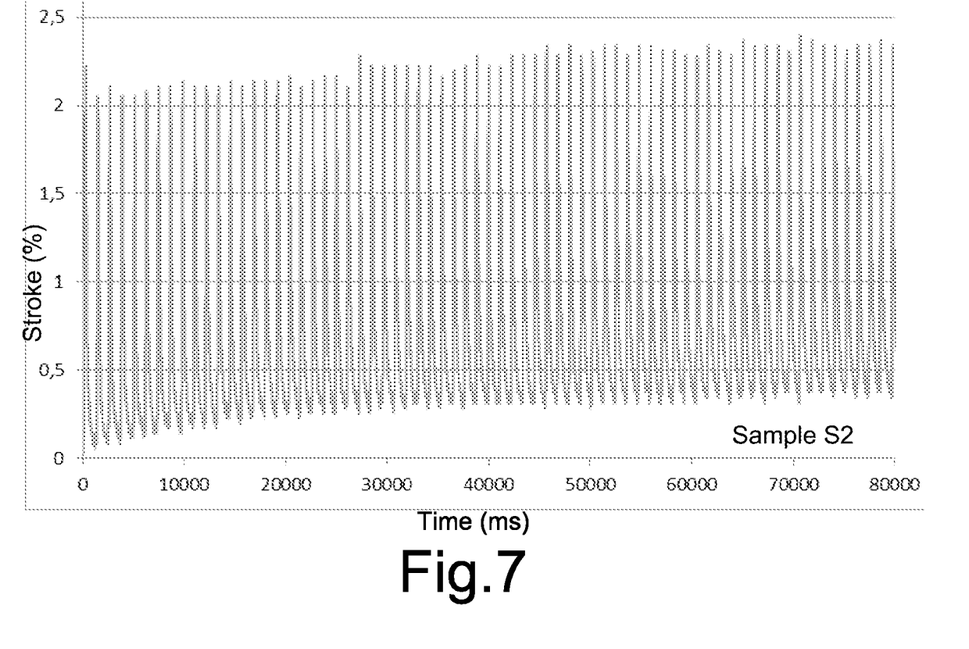

As it may be seen in FIG. 2 the stroke, expressed as a percentage of the SMA wire length, is progressively reduced over time. This is due to a residual strain due to the residual heat in the SMA wires after each actuation cycle. The stroke reduction has a substantially linear trend for the first 40 activation cycles, resulting in a residual strain of about 30%. The sample S1 instead shows negligible stroke reduction, while sample C3, whose coating contains a dispersion of PCM particles having a weight ratio lower than lower end of the range defined above, allows to achieve a limitation of the residual strain only under 10-15% for about 30 activation cycles.

Surprisingly, comparative example C4 having a higher amount of PCM material has the worst behavior of all the tested samples, as the morphology or porosity of the "coating" material (PCM as-is) hinders an efficient thermal diffusion throughout the "coating", leading to much worse performance. Sample C4, although made using the PCM material "as is", is a representation of what will happen when an excessive amount of PCM is used.

Rather than considering the absolute values of the residual strain, it is important to observe that the presence of PCM particles in the coating affects heat absorption and hence modifies the trend of the stroke in the actuation profiles. In samples C1 and C2 the shape of the actuation profiles is substantially the same even though the presence of a coating in comparative sample C2 allows to achieve a lower stroke reduction. In fact the residual strain increases after each activation cycle and finally reaches a sort of dynamic equilibrium in heat transfer (plateau). The dynamic equilibrium depends on surrounding temperature, geometry of the sample and heat transfer coefficients of the materials, namely the material of which the SMA wires are made, the coating material and ambient air. A dynamic equilibrium is established when the heat generated by the SMA wire corresponds to the heat dissipated at the interface between coating and ambient air.

A similar behavior can be observed in comparative sample C3, even though the provision of PCM particles in the coatings allows to achieve a lower stroke reduction than comparative samples C2 and C1. Differently, in samples S1 and S2 due to the provision of coatings having a dispersion of PCM particles in an amount falling in the range defined above relative to the weight of the coated portion of the respective SMA wires, two different equilibrium plateaus may be observed. In particular with regards to sample S1, the first one (in the first 30 activation cycles) is related to the thermal storage of the PCM particles dispersed in the coatings, which absorb part of the thermal energy generated by the SMA wires, thus preventing the coating from rising its own temperature. Once the heat storage capacity of the PCM particles has been saturated, the coating temperature is increased and the actuator assembly reaches a second equilibrium plateau. The advantages of the present invention are even more evident with sample S2, where only the first plateau equilibrium is observable over the test duration.

This technical effect is further evidenced in table 2 below, showing the number of activation cycles that are necessary to achieve an unrecovered strain of 0.3% and 0.6% respectively.

TABLE 2

| | Stroke decrease | |
|---|---|---|
| Sample ID | Cycles to 0.3% residual strain | Cycles to 0.6% residual strain |
| C1 | 3 | 6 |
| C2 | 7 | 15 |
| C3 | 19 | 38 |
| C4 | 1 | 2 |
| S1 | 27 | 48 |
| S2 | 45 | all |

From table 2 it is possible to observe that sample S1 allows to maintain its activation features (27/48 cycles), i.e. having an unrecovered strain within 0.6%, for almost 50 activation cycles as well as a high compensating feature for more than 25 activation cycles (unrecovered strain within 0.3%), resulting in a significant improvement over uncoated wires (comparative sample C1, 3/6 activation cycles), as well as over coated wires having no PCM particles (comparative sample C2, 7/15 activation cycles), with PCM particles dispersed at a lower concentration (comparative sample C3, 19/38 activation cycles) and with a higher PCM amount as in comparative sample C4 (1/2). The advantages of the present invention are even more evident by looking at sample S2, having about 45 cycles with unrecovered strain around 0.3%, and no point below 0.6% for the experiment duration.

The invention claimed is:

1. An actuator assembly, comprising:
   a core made up of a shape memory alloy wire; and
   a coating made of an electrically insulating material applied or formed onto at least a portion of said core so as to constitute a coating of the shape memory alloy wire, wherein said coating contains a distribution of Phase Changing Material (PCM) particles,
   wherein a ratio between the weight of Phase Changing Material particles dispersed in the coating and the weight of the portion of the shape memory alloy wire on which the coating is applied or formed is comprised between 7 and 16.

2. The actuator assembly according to claim 1, wherein said coating is applied or formed on at least 80% of the length of the shape memory alloy wire.

3. The actuator assembly according to claim 1, wherein the diameter of the shape memory alloy wire is comprised between 0.1 mm and 0.8 mm.

4. The actuator assembly according to claim 1, wherein the thickness of the coating is comprised between 0.1 mm and 3 mm.

5. The actuator assembly according to claim 1, wherein a ratio between the diameter of the coated shape memory alloy wire and the diameter of its core made up of shape memory alloy wire is comprised between 2 and 5.

6. The actuator assembly according to claim 1, wherein the average size of the Phase Changing Material particles is comprised between 0.01 and 0.1 mm.

7. The actuator assembly according to claim 1, wherein the shape memory alloy wire is made of a Ni—Ti based alloy.

8. The actuator assembly according to claim 1, wherein said electrically insulating material is chosen among plastic and thermoplastic polymeric materials, thermosetting polymeric materials, resins and silicones.

9. The actuator assembly according to claim 1, wherein said Phase Changing Materials particles are made of organic or inorganic compounds, fatty acids, esters, salts, hydrates or wax.

10. The actuator assembly according to claim 9, wherein said Phase Changing Material particles are have a core-shell structure in which the core is a PCM material and is enclosed in the shell, which is a non-PCM material, wherein the non-PCM material has a fusion temperature higher than the fusion temperature of the PCM material.

11. An active system, comprising:
one or more of the actuator assemblies according to claim 1.

12. The active system according to claim 11, wherein said one or more actuator assemblies are inserted into the system so as to provide an activation pattern.

13. The active system according to claim 11, wherein the number of actuator assemblies is comprised between 2 and 100 per unit length of the active system.

14. The active system according to claim 11, wherein the total cross section of the SMA wires of the actuator assemblies is comprised between 0.007 mm$^2$ and 0.5 mm$^2$.

15. The active system according to claim 11, wherein said active system is an active fabric.

16. An actuator assembly, comprising:
a core made up of a shape memory alloy wire; and
a coating made of an electrically insulating material applied or formed onto at least a portion of said core so as to constitute a coating of the shape memory alloy wire, wherein said coating contains a distribution of Phase Changing Material (PCM) particles,
wherein a ratio between the weight of Phase Changing Material particles dispersed in the coating and the weight of the portion of the shape memory alloy wire on which the coating is applied or formed is comprised between 1 and 30, and
wherein the actuator assembly exhibits an unrecovered strain of 0.6% or less after at least 48 of 50 subsequent activation cycles, wherein unrecovered strain is measured by subjecting a parallel arrangement of nine of the actuator assemblies to 50 activation cycles with a current of 8 Ampere at a frequency of 1 Hz.

17. The actuator assembly according to claim 16, wherein the diameter of the shape memory alloy wire is comprised between 0.1 mm and 0.8 mm.

18. The actuator assembly according to claim 16, wherein the thickness of the coating is comprised between 0.1 mm and 3 mm.

19. The actuator assembly according to claim 16, wherein a ratio between the diameter of the coated shape memory alloy wire and the diameter of its core made up of shape memory alloy wire is comprised between 2 and 5.

20. The actuator assembly according to claim 16, wherein an average size of the Phase Changing Material particles is comprised between 0.01 and 0.1 mm.

* * * * *